Patented Feb. 10, 1942

2,272,324

UNITED STATES PATENT OFFICE 2,272,324

PROCESS FOR MAKING REFRACTORY MATERIALS

Harley C. Lee, Columbus, Ohio, assignor to Basic Refractories, Incorporated, Cleveland, Ohio, a corporation of Ohio No Drawing. Application March 1, 1938, Serial No. 193,264

10 Claims. (Cl. 106—57)

This invention relates to the production of matured crystalline refractory material by forming the refractory portion in the presence of a comparatively large amount of liquid phase at a comparatively low temperature and separating the liquid fraction from the refractory portion. It is among the objects of the invention to utilize for the formation of the liquid phase otherwise undesired constituents of the raw material and so remove these in the liquid phase. A further object is to concentrate refractory constituents in available lower grade materials.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Naturally available sources of materials such as magnesia, alumina, oxides of chromium, beryllium, zirconium, etc., are frequently of low concentration or are contaminated with material precluding desirable usage. For instance, in the preparation of magnesium oxide, it is customary to employ only quite highly pure materials such as magnesite and brucite, and in preparing magnesia refractories the usual practice is to use selected magnesite. The occurrence of high grade magnesite and brucite is quite limited, or restricted to localities far removed from consuming centers, while on the other hand there are vast quantities of lower grade magnesian materials such as dolomites, silicious and calcareous or dolomitic magnesites, or ferruginous magnesites, in many places not far remote from points of usage, or readily accessible for shipping. These lower grade materials often contain undesirable amounts or proportions of such impurities as silica, iron oxide, alumina and lime and it is desirable that objectionable impurities be removed or suitably reduced in amount or be converted into useful or less objectionable forms. In accordance with my invention, raw materials containing undesired substances are made more adaptable for service by incorporating substances such that when the mass is heated a liquid phase is formed, at comparatively low temperatures, the liquid phase being the reaction product involving the substances to be removed from the raw material and the reacting substance added thereto. The liquid phase should have a composition to insure a low melting temperature, and a low viscosity, and should be in equilibrium with the refractory constituents. For economy the liquid should have a low solubility for the refractory constituent. A large amount of liquid phase is ordinarily formed and this brings about unusual mineralization with the resultant formation of a crystalline refractory product. Since the liquid phase is later removed, the amount of liquid may vary considerably and this makes available a wide selection of raw materials. The mass is heated sufficiently to develop two fractions, a liquid fraction and an undissolved refractory fraction which can be separated. It is usually not practical to completely separate these two fractions. Oxides, as mentioned, and such normally unmeltable materials as bauxite, diaspore, chromite, magnesite, dolomite, brucite, etc., may thus be beneficiated or concentrated, and undesired contaminations be eliminated. Magnesian materials may for instance be converted into products of high magnesia content, which can be employed for desired usages. In this manner, by heating such a material in the presence of a substance combinable with a constituent constituting an impurity, a relatively low melting portion may be separated from the un-fused material. Separation of the fused and un-fused fractions may be accomplished by the tendency to separate into two layers, where the difference in specific gravity of the liquid and un-fused fractions is sufficient and enough of the liquid phase is formed, or the liquid may simply be drained or sweated from the un-fused portion. Low grade magnesian material may be beneficiated or made adaptable for various services by incorporating substances such that when the mass is heated a liquid phase is formed which can be readily separated from the undissolved magnesia, such liquid phase removing a large part of the unwanted constituents and leaving a residual fraction of high magnesia content. A complete separation of the liquid phase is seldom possible, so it is desirable to form a liquid phase which may add desirable properties to the magnesia; or, if a product of greater purity is desired, to provide a liquid phase such that any small residual quantity can be removed in part by other means.

To promote the formation of mature crystalline periclase for example and to facilitate separation of the two fractions I prefer to form not less than about 20 per cent of liquid phase, and I have formed and separated products containing about 80 per cent of liquid phase. The process has been found particularly adaptable for the production of calcium ferrite bonded magnesia refractories. Calcium ferrite is used as a quick setting bond for dolomite refractories and for high magnesia refractories as set forth in U. S. Patent No. 1,965,605. In general from 15 to about 30 per cent of ferrite bond is required to set the material rapidly. Periclase is the desirable and most permanent refractory constituent. Silica forms calcium silicates in such refractories which is undesirable for some open hearth usages. Free or uncombined lime in the dolomite refractories makes the refractory prone to slake in atmospheric storage. Such free lime is later fluxed in open hearth usage and this fluxing is frequently accompanied by loss of valuable refractory material. It is accordingly desirable to reduce the amount of these objectionable materials and this can readily be accomplished through the medium of forming a liquid phase rich in calcium ferrite and removing this calcium ferrite liquid in part from the undissolved magnesia portion. The calcium ferrite liquid can dissolve large amounts of calcium silicate and so removes such silicate from the refractory portion. In forming calcium ferrite, sufficient lime should be present to form dicalcium silicate with the silica present and additional lime must be present along with iron oxide and alumina to form calcium ferrites, calcium alumina ferrites or calcium aluminates. From one to two mols of lime should then be present to form calcium ferrite with the iron oxide and from one to three mols of lime should be present to form calcium aluminate with the alumina. In general it is necessary to form from about one and one half to about three parts of calcium ferrite or aluminate for each part of silicate in order to dissolve the silicate. By the term, calcium ferrite, I also include calcium aluminates or chromites or calcium alumino ferrites or their melted equivalents which may be formed, and I also include such calcium silicate as may be fluxed or dissolved by the liquid phase rich in calcium ferrite. In such manner, for instance dolomite in proportion of 10.8 parts by weight, brucite 9 parts, and mill scale 4.8 parts, are mixed together and briquetted by addition of sufficient water for molding, and after being dried are heated to around 1500° C. This temperature is held for about four hours and as a result of this heating a liquid phase rich in calcium ferrite forms and drains out, leaving an enriched magnesia portion. In a typical analysis, such original mixture having on a calcined basis a content of MgO 47, CaO 21, $Fe_2O_3$ 29, $Al_2O_3$ 1, and $SiO_2$ 2, yielded a material having an MgO content of 81 per cent and $SiO_2$ 0.3 per cent as a residue after the partial draining away of the liquid phase. In similar manner, a mixture of 10.5 parts by weight of dolomite and 4.8 parts of mill scale, the total analyzing on a calcined basis MgO 21.4, CaO 31.5, $Fe_2O_3$—$Al_2O_3$ 46.6 per cent, and $SiO_2$ 0.5 per cent, yielded a product containing 70 per cent magnesia after the removal of part of the liquid phase. Such magnesia remains in a desirable form for refractory usages and can be crushed and be formed into shapes to be refired or can be employed directly for forming hearths of furnaces. The liquid rich in calcium ferrite which remains with the magnesia serves as a low temperature bond useful in forming monolithic hearths, and the liquid phase rich in calcium ferrite which is drained or separated out is of utility in various directions, as for instance as a pre-formed flux for maturing or bonding various basic refractories or it may be used directly as a metallurgical flux or as an open hearth slag conditioner. Liquids containing calcium chromites, calcium aluminates, etc., in place of part or all of the calcium ferrite may analogously be separated out, leaving un-melted residue, and such chromites, aluminates, etc., also are of utility in various applications. These liquids rich in calcium ferrite, or containing calcium aluminate or chromite dissolve calcium silicates, and silica can thus be removed from the original material.

There being such a large amount of liquid surrounding the non-fusing constituent, magnesia provided in accordance with the invention matures as is not possible with the small amount of flux provided by customary magnesia refractory preparation. The crystals of periclase develop and grow under highly favorable conditions, with the formation of large grains particularly favorable for separation and ultimate refractory usage, and after the liquid is drained out, the products contain for instance 55 to 75 per cent of MgO, and on microscopic examination an especially completely matured periclase structure is found, with refractory grains in close adjacency and with ferrite visible between grains.

The raw materials may be employed in such sizes as are convenient. Large furnacing operations can take care of relatively coarse material, the material may be crushed, as for instance to pass one-eighth inch mesh. The material may be finely ground, and briquetted for processing. The temperatures of the process are such as to form a relatively low-fusing liquid phase. The extent of beneficiation is a function of the temperature and length of heating, there being however somewhat less efficacy in raising the temperature very materially above that sufficient to melt out the low fusing phase. Where large amounts of iron oxide are used in separating magnesia it is important to insure oxidizing condition during the processing. Temperatures around 1450° C. or somewhat higher are thus suitable for raw materials on the order of dolomite, magnesites, brucite, and the like, and temperatures of 1450–1500° C. maintained for four or five hours are generally adequate to concentrate dolomite up to 60—about 80 per cent MgO. Relatively pure dolomites, having preferably low silica, and containing for instance 15–22 per cent MgO, and 29–35 per cent CaO, are notably favorable raw materials for beneficiation. Dolomitic magnesite, as of Quebec, and breunnerite, are also very advantageously thus treated, as likewise silicious or sedimentary magnesite such as of Nevada and California, containing 25–40 per cent MgO, 3–9 per cent CaO, and 4–15 per cent $SiO_2$.

It is frequently not necessary to remove all of the less desirable constituents from such raw materials. For instance a greatly improved dolomitic hearth refractory can be made by removing only part of the lime in dolomite and forming a refractory containing about 45 to about 70 per cent magnesia. Such a refractory can have from about 15 to about 30 per cent of residual ferrite in it for a coalescing bond. The refractory may contain up to 30 per cent of uncombined lime. This lime grows and matures in the presence of the calcium ferrite liquid. The large lime crystals resulting after the removal of ferrite liquid are still encased in ferrite and such lime is remarkably resistant to hydration or slaking. As an example illustrative of the beneficiation of a dolomite I take 35 parts of dolomite and 8 parts of iron oxide the mixture containing on a calcined basis approximately $SiO_2$ 1 per cent, $Fe_2O_3,Al_2O_3$ 30 per cent, CaO 42 per cent, Mgo 27 per cent; after heating the material on a sloping hearth furnace in an oxidizing atmosphere for four hours at a temperature of 1450° C. considerable liquid rich in ferrite drains away leaving a residual crystalline product which analyzed $SiO_2$ 0.5, $Fe_2O_3$ 11.5, $Al_2O_3$ 0.5, CaO 37.5, MgO 50. The refractory product comprises large crystals of periclase and large crystals of lime both surrounded by a small amount of a calcium ferrite matrix. Such a product has marked utility as an inexpensive quick setting repair material for open hearth furnace usage.

Other modes of applying the principle of the invention may be employed, change being made as regards the details described, provided the features stated in any of the following claims, or the equivalent of such, be employed.

I therefore particularly point out and distinctly claim as my invention:

1. In a process of the character described, incorporating with a dolomite material an agent reactive with a constituent thereof to formation of a liquid phase at elevated temperature, and separating the liquid phase from the un-fused portion.

2. In a process of the character described, heating an impure beryllium oxide material with an agent forming a liquid with a constituent thereof, and separating such liquid from the un-fused portion.

3. In a process of the character described, eliminating contaminating material from zirconium oxide by reacting the contaminating material into a melted phase, and separating such melted phase from non-fused material.

4. In a process of the character described, beneficiating a refractory material of the group consisting of compounds of magnesium, chromium, beryllium and zirconium, by reacting a contaminating material thereof with a reactant into a molten phase, and separating the latter from the non-fused portion.

5. In a process of the character described, beneficiating magnesia by heating crude magnesian materials with a component reactive to the formation of a molten fraction, and separating the molten fraction from the un-melted magnesia.

6. In a process of the character described, concentrating magnesia by heating a crude magnesian material with a reagent combinable with a constituent thereof to formation of a molten phase, and separating such molten phase from the un-melted magnesia.

7. In a process of the character described, concentrating magnesia by adding iron oxide to a crude magnesian material, heating to the formation of a fusible ferrite, and separating the fused portion from the un-melted magnesia.

8. In a process of the character described, raising the magnesia content of dolomitic material by reacting suitable oxides with the lime content thereof to the formation of a fusible calcium compound, and removing such calcium compound.

9. In a process of the character described, forming a magnesia refractory material containing calcium ferrite from dolomitic material by reacting lime therein with iron oxide to the formation of fusible calcium ferrite, removing calcium ferrite from the mass and recovering a magnesian refractory material containing residual calcium ferrite.

10. In a process of the character described, reducing the silica content of low grade magnesian material by heating such material with a reagent to formation of a molten phase and action on silica, and separating such molten phase from the un-melted material.

HARLEY C. LEE.